United States Patent
McGarry et al.

(10) Patent No.: US 11,507,661 B2
(45) Date of Patent: Nov. 22, 2022

(54) DETECTION OF INDICATORS OF ATTACK

(71) Applicant: DELL PRODUCTS, LP, Round Rock, TX (US)

(72) Inventors: Marc N. McGarry, Murphy, TX (US); Nizar A. Basan, Garland, TX (US); Bradley C. Rood, Grapevine, TX (US); Andy A. Yiu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 91 days.

(21) Appl. No.: 17/193,152

(22) Filed: Mar. 5, 2021

(65) Prior Publication Data

US 2022/0284097 A1    Sep. 8, 2022

(51) Int. Cl.
*G06F 21/00* (2013.01)
*G06F 21/56* (2013.01)
*G06F 21/57* (2013.01)

(52) U.S. Cl.
CPC .......... *G06F 21/566* (2013.01); *G06F 21/572* (2013.01); *G06F 2221/034* (2013.01)

(58) Field of Classification Search
CPC . G06F 2221/034; G06F 21/572; G06F 21/566
USPC ............................................................ 726/1
See application file for complete search history.

(56) References Cited

U.S. PATENT DOCUMENTS

| | | | |
|---|---|---|---|
| 8,811,619 B2* | 8/2014 | Khatri | G06F 21/575 380/279 |
| 10,708,290 B2* | 7/2020 | Steelman | G06N 3/0454 |
| 10,855,619 B1 | 12/2020 | Andrews et al. | |
| 2007/0162733 A1* | 7/2007 | Dennis | G06F 21/572 713/1 |
| 2014/0304520 A1* | 10/2014 | Bobzin | G06F 21/572 713/187 |
| 2019/0012465 A1* | 1/2019 | Kim | G06F 9/45558 |
| 2020/0364342 A1* | 11/2020 | Martinez | G06F 21/50 |
| 2020/0372156 A1* | 11/2020 | Sayyed | G06F 21/577 |
| 2021/0240567 A1* | 8/2021 | Hsu | G06F 9/4406 |

* cited by examiner

*Primary Examiner* — Josnel Jeudy
(74) *Attorney, Agent, or Firm* — Larson Newman, LLP (57) ABSTRACT

An information handling system includes a basic input/output system (BIOS), a memory, and a processor. The processor scans a current state of each BIOS attribute in the BIOS, and stores one or more changed attributes in a secure event log in the memory. The processor converts each changed attribute into a different threat event including a first changed attribute into a first threat event. The processor provides a list of threat events to multiple threat chains, each of which determine whether the threat events match threat criteria in a threat chain policy. In response to the threat event matching a threat criterion in the threat chain policy, the threat chain provides a threat state change to the processor, which in turn provides new threat state changes to a threat state change consumer.

20 Claims, 4 Drawing Sheets

DETECTION OF INDICATORS OF ATTACK

FIELD OF THE DISCLOSURE

The present disclosure generally relates to information handling systems, and more particularly relates to detection of indicators of attack.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a basic input/output system (BIOS), a memory, and a processor. The BIOS includes multiple BIOS attributes associated with the information handling system. The memory stores a secure event log associated with the attributes in the BIOS. The processor may scan a current state of each of the BIOS attributes, and store one or more changed attributes in the secure event log including a first changed attribute. The processor may convert each changed attribute into a different threat event including the first changed attribute into a first threat event. The processor may provide a list of threat events including the first event to multiple threat chains, each of which may determine whether the first threat event matches threat criteria in a threat chain policy. In response to the first threat event matching a threat criterion in the threat chain policy, the threat chains may provide a threat state change to the processor, which in turn may provide new threat state changes to a threat state change consumer.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
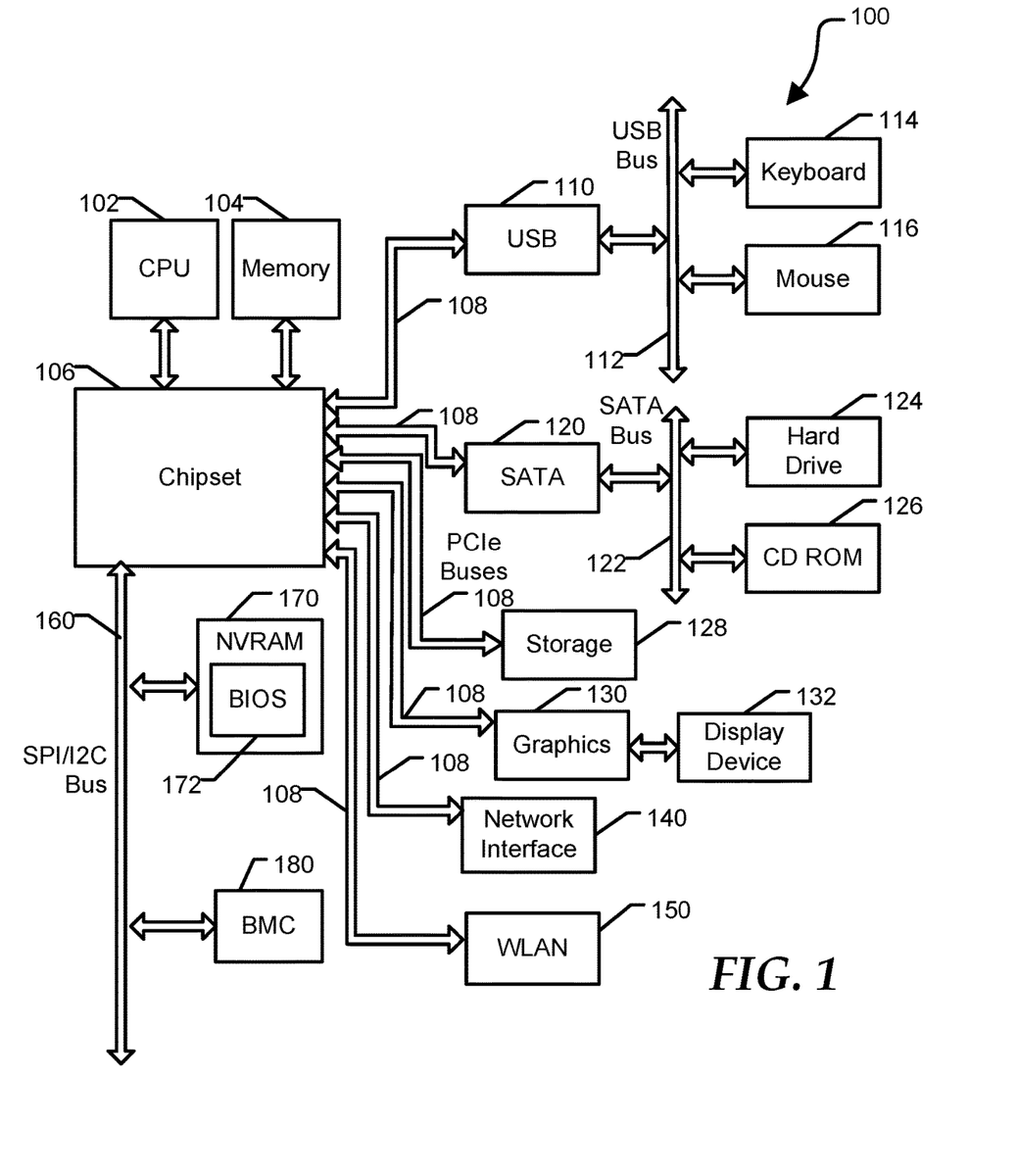
FIG. 1 is a block diagram of a general information handling system according to at least one embodiment of the present disclosure.

FIG. 1 illustrates a general information handling system 100. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more busses operable to transmit communications between the various hardware components.

Information handling system 100 including a processor 102, a memory 104, a chipset 106, one or more PCIe buses 108, a universal serial bus (USB) controller 110, a USB bus 112, a keyboard device controller 114, a mouse device controller 116, a configuration a SATA bus controller 120, a SATA bus 122, a hard drive device controller 124, a compact disk read only memory (CD ROM) device controller 126, a storage 128, a graphics device controller 130, a network interface controller (NIC) 140, a wireless local area network (WLAN) or wireless wide area network (WWAN) controller 150, a serial peripheral interface (SPI) bus 160, a NVRAM 170 for storing BIOS 172, and a baseboard management controller (BMC) 180. In an example, chipset 106 may be directly connected to an individual end point via a PCIe root port within the chipset and a point-to-point topology as shown in FIG. 1. BMC 180 can be referred to as a service processor or embedded controller (EC). Capabilities and functions provided by BMC 180 can vary considerably based on the type of information handling system. For example, the term baseboard management system is often used to describe an embedded processor included at a server, while an embedded controller is more likely to be found in a consumer-level device. As disclosed herein, BMC 180 represents a processing device different from CPU 102, which provides various management functions for information handling system 100. For example, an embedded controller may be responsible for power management, cooling management, and the like. An embedded controller included at a data storage system can be referred to as a storage enclosure processor.

System 100 can include additional processors that are configured to provide localized or specific control functions, such as a battery management controller. Bus 160 can include one or more busses, including a SPI bus, an I2C bus, a system management bus (SMBUS), a power management bus (PMBUS), and the like. BMC 180 can be configured to provide out-of-band access to devices at information handling system 100. As used herein, out-of-band access herein refers to operations performed prior to execution of BIOS 172 by processor 102 to initialize operation of system 100.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, such as a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One or more components can be integrated together. For example, portions of chipset 106 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display. An example of information handling system 100 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Figure 2:
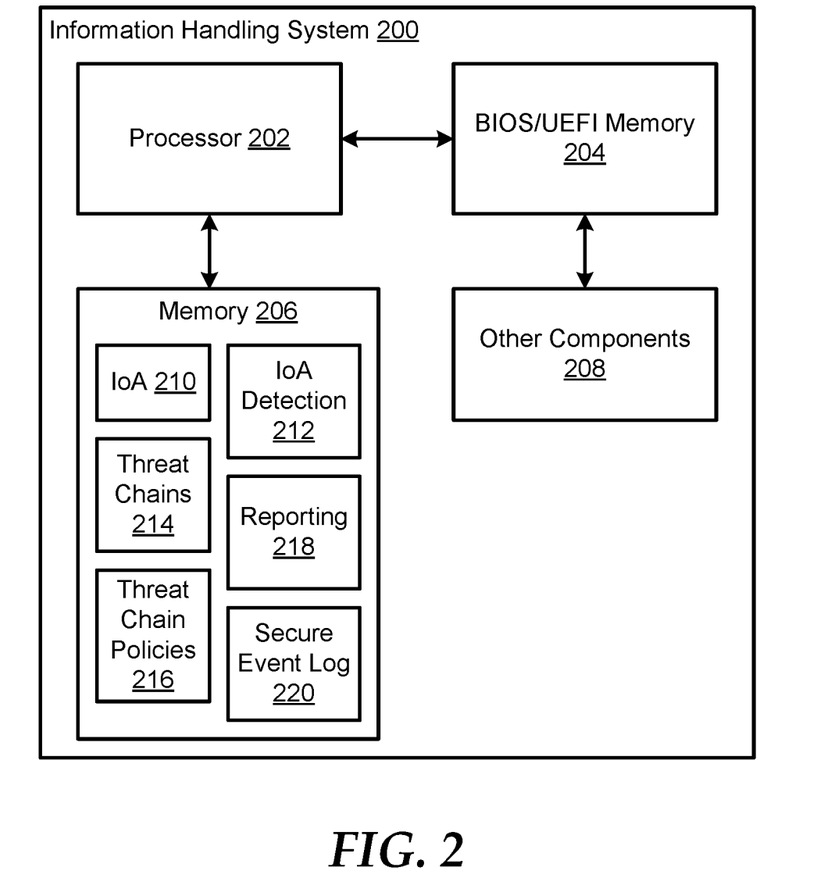
FIG. 2 is a block diagram of a portion of an information handling system according to at least one embodiment of the disclosure.

In an example, information handling system 100 may include any suitable device including, but not limited to, information handling system 200 of FIG. 2. Information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video, or data communication. Further, while a single information handling system 100 is illustrated, the term "system" shall also be taken to include any collection of systems or sub-systems that individually or jointly execute a set, or multiple sets, of instructions to perform one or more computer functions.

FIG. 2 illustrates a portion of an information handling system 200 according to at least one embodiment of the disclosure. Information handling system 200 includes a processor 202, a basic input/output system (BIOS)/unified extensible firmware interface (UEFI) (BIOS/UEFI) memory 204, another memory 206, and other components 208. In an example, processor 202 may access BIOS/UEFI memory 204 to scan BIOS attributes stored within the BIOS/UEFI memory as will be discussed herein. Processor 202 may access memory 206 to perform one or more suitable operations including, but not limited to, store and retrieve data, and execute one or more applications. In certain examples, other components 208 may include any additional suitable components of information handling system 200 without varying from the scope of this disclosure.

Memory 206 may store data accessible by processor 202, and may also store any suitable modules and applications executable by the processor. For example, memory 206 includes indicator of attacks (IoAs) module 210, an IoA detection module 212, multiple threat chains 214, multiple threat chain policies 216, a reporting module 218, and a secure event log 220. In an example, IoAs module 210, IoA detection module 212, threat chains 214, threat chain policies 216, and reporting module 218 may be incorporated within an OS of information handling system, and may be utilized by processor 202 to detect IoAs of the information handling system. In certain examples, IoAs module 210, IoA detection module 212, threat chains 214, threat chain policies 216, and reporting module 218 may be components of BIOS/UEFI security agent configured to be executed by processor 202 to detect security threats by monitoring BIOS attributes changes made within BIOS/UEFI memory 204.

In an example, each threat chain 214 may include one or more BIOS/UEFI attribute changes that, if detected, may be indicative of a threat or attack. Each BIOS/UEFI attribute change may be represented by a modification to the attribute in any suitable manner including, but not limited to, a binary flag, a selection from a list associated with the BIOS/UEFI configuration and stored in NVM 205. Threat chain 214 may contain a threat chain policy 216.

In an example, a threat chain policy 216 for a particular threat chain 214 may include a collection of BIOS attribute states that indicate a specific attack. For example, threat chain policy 214 may include a name, category, and list of one or more threat criteria for a particular attack. In certain examples, a threat chain policy 216 may include an initially empty history of matched threat criteria and an initially empty history of matched threat events. The history of matched threat criteria may be used to identify when the threat chain state is clear, partially matched, or fully matched as described below. In an example, the history of matched threat events may be saved to provide detailed reporting to the user of information handling system 200.

In an example, reporting module 218 includes program instructions that, upon execution by processor 202, may issue alerts, reports, and/or notifications to an administrator or the user about a detected BIOS/UEFI attack. In some cases, memory 206 may store, in secure event log 220, historical values for BIOS attributes as they change over time. In other cases, memory 206 may retain, in secure event log 220, only the currently set value for each BIOS attribute.

With respect to parameters collected concurrently with attribute changes, in some cases, a given BIOS attribute change may be associated with a "boot number" value that indicates, with respect to a preceding BIOS attribute change, whether the given change must be made in the same boot cycle, in a subsequent boot cycle, within a number of boot cycles, or after a number of boot cycles of information handling system 200, in order for an attack to match a particular threat chain 214. Additionally, or alternatively, a threat chain 214 may include a time interval between a first BIOS attribute change and a second BIOS attribute change, such that, in order to an attack to match that threat chain, the second change must be made within the time interval or after the time interval. Concurrently with the detection of BIOS/UEFI attribute value changes, a timestamp associated with each such change may also be stored and evaluated.

In certain examples, operations performed by IoA module 210, IoA detection module 212, threat chains 214, threat chain policies 216, and reporting module 218 may be executed in any suitable dedicated hardware device including, but not limited to, field-programmable gate array (FPGA) circuitry and an application-specific circuit (ASIC) without varying from the scope of this disclosure. Execution, by processor 202, of one or more of IoA module 210, IoA detection module 212, threat chains 214, threat chain policies 216, and reporting module 218 will be described with respect to FIGS. 2 and 3 below.

Figure 3:
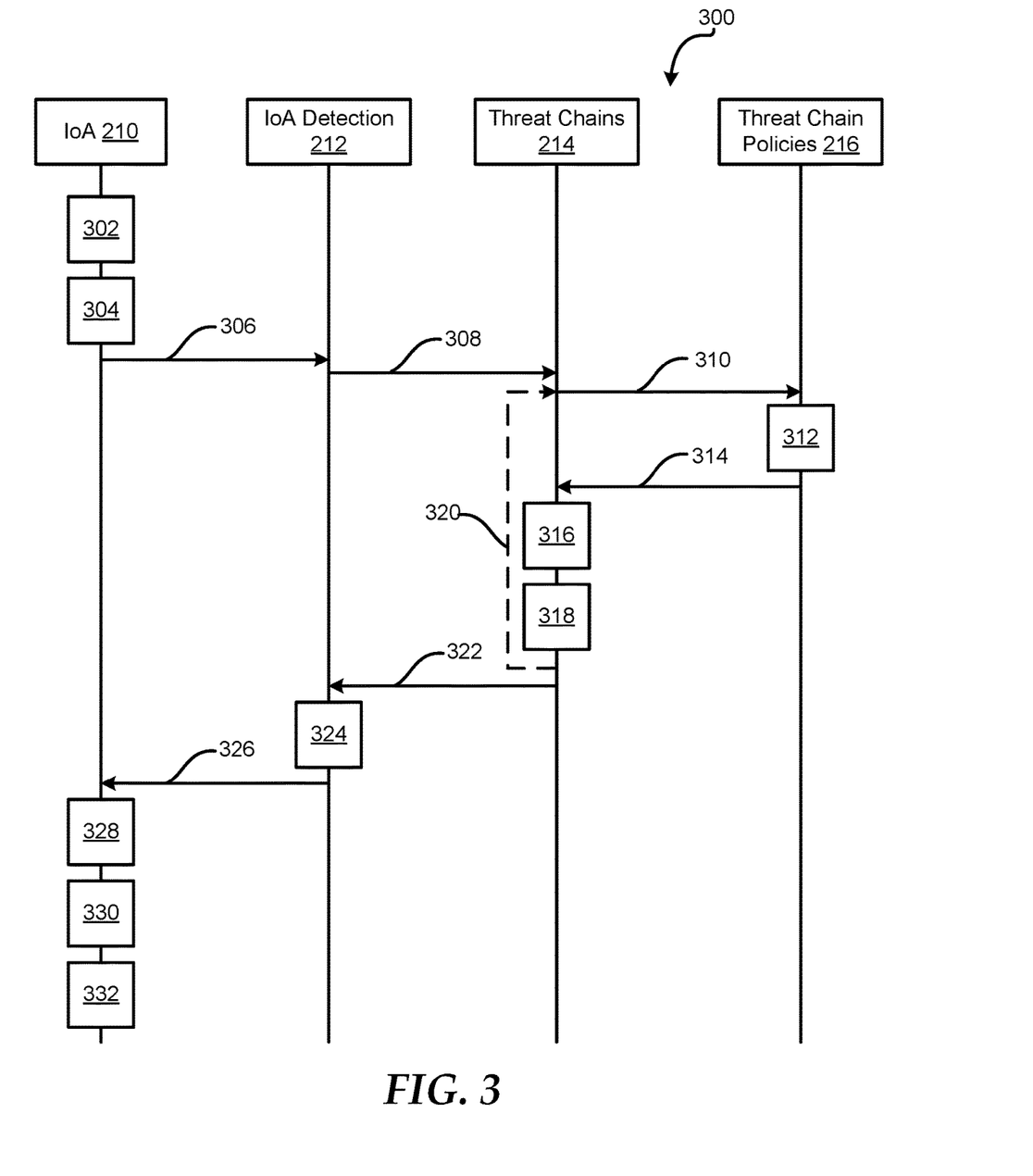
FIG. 3 is a diagram of operations performed within a processor according to at least one embodiment of the disclosure.

FIG. 3 illustrates a set of operations 300 performed by a processor, such as processor 202 of FIG. 2, according to at least one embodiment of the disclosure. In an example, processor 202, or any other suitable device, may scan BIOS attributes within memory 204 to receive a current attribute state for each of the BIOS attributes. Processor 202 may compare the current state of each BIOS attribute to an original state of the corresponding BIOS attribute to determine whether a state change has occurred. In an example, the original states of the BIOS attributes may be store in any suitable memory including, but not limited to, secure event log 220 of memory 206 in FIG. 2. Based on one or more BIOS attribute state changes, processor 202 may store BIOS events in secure event log 220.

During operation 302, IoA module 210 may read BIOS events from secure event log 220. In an example, a BIOS event may include any suitable data in any suitable format to indicate a BIOS attribute state change. For an example, the BIOS event may be true/false, on/off, a numerical value, or the like. During operation 304, IoA module 210 may convert the BIOS events to threat events. In an example, IoA module 210 may convert the BIOS event in any suitable manner including, but not limited to, converting the BIOS event from its current format to a string format for the threat event. The string format for a particular threat event may include 'attribute name, current value'. For example, a threat event may include 'secure boot, off', and this threat event may indicate that BIOS attribute 'secure boot' has changed from an 'on' state to an 'off' state.

During operation 306, IoA module 210 may provide the threat events to IoA detection module 212. In certain examples, IoA module 210 may determine whether the threat event has been previously detected and sent to IoA detection module 212. If so, IoA module 210 may not notify IoA detection module of the threat event. During operation 308, IoA detection module 212 may provide each threat event to each threat chain 214 of information handling system 200. In an example, IoA detection module 212 may include a list of threat chains 214, processing of the IoAs, or the like. In certain examples, a threat chain may include one or more BIOS attribute states to determine an attack is in progress or has occurred. For example, a threat chain may include a list of three BIOS attributes and all of the three BIOS attributes should have a threat event associated with the BIOS attribute to indicate an attack is in progress or has occurred.

During operation 310, the threat events are provided to each of threat chain policies 216 for threat chains 214. In certain examples, operations 312, 314, 316, and 318 may be repeated for each threat chain 214 as illustrates by dashed arrow 320. For example, each of the threat events is provide to a first threat chain policy 216 for a first threat chain 214. During operation 312, threat chain policy 216 may compare each threat event to the threat criteria for the associated threat chain 214. Based on the comparison of all threat events to all threat criteria, threat policy 216 may return a threat event match results for each threat event during operation 314. In an example, the threat event match results may indicate whether a particular threat event matches one of the criteria for threat chain 214.

During operation 316, the threat event match results may be stored. In certain examples, the threat event match results may be stored within any suitable memory including, but not limited to, memory 206. In an example, a history, such as previous the threat event match results may be stored on a threat chain-by-threat chain basis. During operation 318, a threat state change is generated for threat chain 214. For example, a determination is made whether an attack associated with a particular threat chain 214 appears or clears. In an example, a current status of an attack may be compared with a previous status of the attack to determine whether the attack has appeared or has cleared. The generated threat state change may indicate not changed, partially changed, or fully changed. The threat state change may also include a threat chain identifier and a category for a matching threat chain. The threat state change may further include any other suitable information about the threat event and threat chain including, but not limited to, a previous threat state of the threat chain, a current threat state of the threat change, a timestamp describing when the threat state change was created, and a threat event history of the threat chain after the threat event was processed. If additional threat chains 214 are present in the information handling system, the operations loop as indicated by arrow 320.

During operation 322, a list of threat state changes is provided to IoA detection module 212. In an example, a single threat state change may be provided for each threat chain 214. During operation 324, IoA detection module 212 may aggregate the threat state changes from all threat chains 214. During operation 326, the aggregated list of threat state changes is provided to IoA module 210. During operation 328, IoA module 210 reads a list of existing threat state changes from secure event log 220. During operation 330, IoA module 210 removes pre-existing threat state changes from the aggregated list. In an example, IoA module 210 may compare the threat state changes in the aggregated list to the existing threat state changes and remove any matching threat state changes from the aggregated list.

During operation 332, the threat state changes in the aggregated list are written to secure event log 220 and a user of the information handling system is notified of the threat state changes. In an example, the user may be notified in any suitable manner including, but not limited to, the threat state changes being written to a log and a message displayed on a console of the information handling system. In certain examples, the threat state changes may include any suitable data associated with the threat state change including, but not limited to, a timestamp indicating when the state changed occurred. In an example, the user may also be notified about the timestamp associated with the threat state change.

Figure 4:
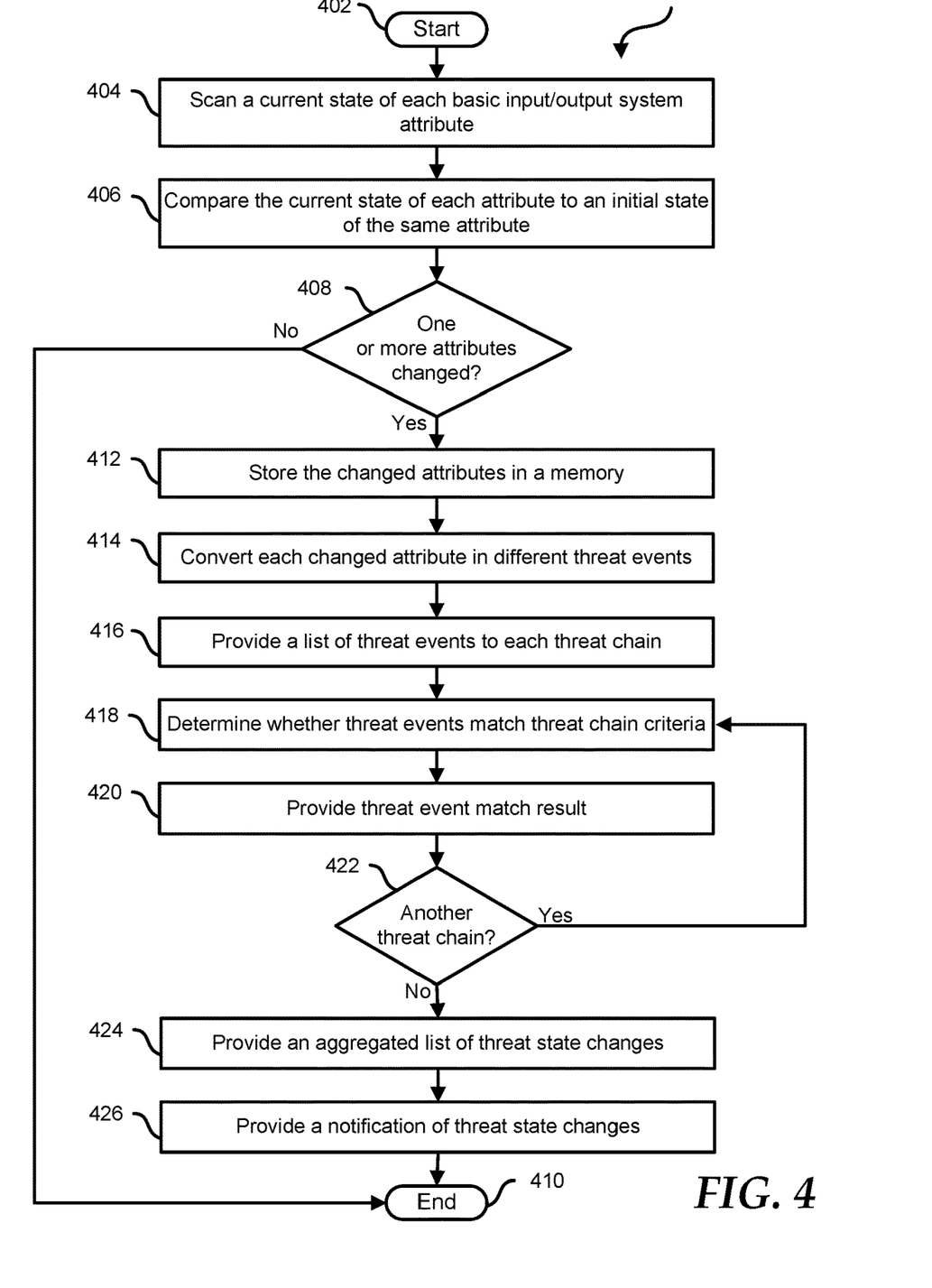
FIG. 4 is a flow diagram of a method for detecting and reporting indicators of attack in an information handling system according to at least one embodiment of the present disclosure.

FIG. 4 is a flow diagram of a method for detecting and reporting indicators of attack in an information handling system according to at least one embodiment of the present disclosure, starting at block 402. It will be readily appreciated that not every method step set forth in this flow diagram is always necessary, and that certain steps of the methods may be combined, performed simultaneously, in a different order, or perhaps omitted, without varying from the scope of the disclosure. FIG. 4 may be employed in whole, or in part, by information handling system 100 depicted in FIG. 1, information handling system 200 in FIG. 2, or any other type of system, controller, device, module, processor, or any combination thereof, operable to employ all, or portions of, the method of FIG. 4.

At block 404, a current state of each BIOS attribute in an information handling system is scanned. In an example, the BIOS attributes may be stored in any suitable memory including, but not limited to, a BIOS/UEFI memory. At block 406, the current state of each attribute is compared to an initial state of the same attribute. At block 408, a determination is made whether one or more attributes have been changed. If no attributes have been changed the flow ends at block 410.

If one or more attributes have been changed, the changed attributes are stored in a memory as BIOS events at block 412. At block 414, each changed attribute or BIOS event is converted into a different threat event. In an example, the BIOS events may be converted into threat events in any suitable manner including, but not limited to, converting the BIOS events from a current format to a string format for the threat events. The string format for a particular threat event may include 'attribute name, current value'.

At block 416, a list of threat events is provided to each threat chain in an information handling system. At block 418, a determination is made whether each threat event matches criteria of the threat chain. In an example, the criteria for a threat chain may be stored within a threat chain policy associated with the particular threat chain. At block 420, threat event match results are provided based on whether the criteria of the threat chain have been matched. In an example, the threat event match results may be evaluated and determination may be made if the state of the current chain has changed. If the state of the current chain has changed, a threat state change is created describing the chain criteria that has been matched or unmatched along with the match indicator. In certain examples, the match indicator may be any suitable identifier for a level or degree of the match including, but not limited to, cleared, partially-matched, and fully-matched.

At block 422, a determination is made whether another threat chain exists in the information handling system. If so, the flow continues as stated above at block 418. Otherwise, an aggregated list of threat state changes is provided at block 424. In an example, the aggregated list may include the threat state changes for every threat chain in the information handling system. At block 426, a notification of threat state changes is provided to a user of the information handling system, and the flow ends at block 410. In an example, the user may be notified in any suitable manner including, but not limited to, the threat state changes being written to a log and a message displayed on a console of the information handling system.

Referring back to FIG. 1, the information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a processor or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a basic input/output system (BIOS), the BIOS including a plurality of BIOS attributes associated with the information handling system;
   a memory to store a secure event log associated with the attributes in the BIOS; and
   a processor to communicate with the BIOS and with the memory, the processor to:
   scan a current state of each of the BIOS attributes;
   store one or more changed attributes in the secure event log, wherein the changed attributes include a first changed attribute;
   convert each of the changed attributes into a different threat event, including the first changed attribute into a first threat event;
   provide a list of threat events including the first threat event to each of a plurality of threat chains;
   determine in each of the threat chains whether the first threat event matches threat criteria in a threat chain policy;
   in response to the first threat event matching a threat criterion in the threat chain policy, provide a threat state change; and
   provide new threat state changes to a threat state change consumer.

2. The information handling system of claim 1, wherein the providing of the threat state change includes: the processor to return each threat event that matches a threat criterion in the threat chain policy, to store the matched threat events in a threat event history, and to generate the threat state change based on appearance or clearing of an attack of the information handling system.

3. The information handling system of claim 1, wherein the processor further to return a single threat state change for each threat chain policy.

4. The information handling system of claim 1, wherein the processor further to generate an aggregated list of threat state changes.

5. The information handling system of claim 1, wherein the processor further to retrieve a list of existing threat state changes from the secure event log in the memory, and to remove pre-existing threat state changes from the aggregated list of threat state changes.

6. The information handling system of claim 1, wherein a threat state for the threat chain indicates a full match when each threat criteria for a particular threat chain is matched.

7. The information handling system of claim 1, wherein the first threat event includes an attribute name and a current value for the attribute.

8. The information handling system of claim 1, wherein each of the threat chains corresponds to a different type of attack on the information handling system.

9. A method comprising:
   scanning, by a processor of an information handling system, a current state of each basic input/output system (BIOS) attribute in a BIOS of the information handling system;
   storing one or more changed attributes in a secure event log of a memory of the information handling system, wherein the change attributes include a first changed attribute;
   converting, by the processor, each of the changed attributes into a different threat event, including the first changed attribute into a first threat event;
   providing a list of threat events including the first threat event to each of a plurality of threat chains;
   determining, by each of the threat chains, whether the first threat event matches threat criteria in a threat chain policy; and
   in response to the first threat event matching a threat criterion in the threat chain policy, generating a threat state change.

10. The method of claim 9, wherein the providing of the threat state change further comprises:
    returning each threat event that matches a threat criterion in the threat chain policy;
    storing the matched threat events in a threat event history; and
    generating the threat state change based on appearance or clearing of an attack of the information handling system.

11. The method of claim 9, further comprising returning a single threat state change for each threat chain policy.

12. The method of claim 9, further comprising generating an aggregated list of threat state changes.

13. The method of claim 9, further comprising:
    retrieving a list of existing threat state changes from the secure event log in the memory; and
    removing pre-existing threat state changes from the aggregated list of threat state changes.

14. The method of claim 9, wherein a threat state for the threat chain indicates a full match when each threat criteria for a particular threat chain is matched.

15. The method of claim 9, wherein the first threat event includes an attribute name and a current value for the attribute.

16. The method of claim 9, wherein each of the threat chains corresponds to a different type of attack on the information handling system.

17. A method comprising: scanning, by a processor of an information handling system, a current state of each basic input/output system (BIOS) attribute in a BIOS of the information handling system; storing one or more changed attributes in a secure event log of a memory of the information handling system, wherein the change attributes include a first changed attribute; converting, by the processor, each of the changed attributes into a different threat event, including the first changed attribute into a first threat event; providing a list of threat events including the first threat event to each of a plurality of threat chains; determining, by each of the threat chains, whether the first threat event matches threat criteria in a threat chain policy; when the first threat event matches a threat criterion in the threat chain policy, then: returning each threat event that matches a threat criterion in the threat chain policy; storing the matched threat events in a threat event history; and generating a threat state change based on appearance or clearing of an attack of the information handling system; retrieving a list of existing threat state changes from the secure event log in the memory; and removing pre-existing threat state changes from the aggregated list of threat state changes.

18. The method of claim 17, wherein a threat state for the threat chain indicates a full match when each threat criteria for a particular threat chain is matched.

19. The method of claim 17, wherein the first threat event includes an attribute name and a current value for the attribute.

20. The method of claim 17, wherein each of the threat chains corresponds to a different type of attack on the information handling system.

* * * * *